United States Patent
Jacob et al.

(10) Patent No.: US 6,893,352 B2
(45) Date of Patent: May 17, 2005

(54) HOMOCINETIC JOINT

(75) Inventors: Achim Jacob, Kiel (DE); Werner Jacob, Frankfurt (DE)

(73) Assignee: GKN Lobro GmbH (DE)

( * ) Notice: Subject to any disclaimer, the term of this patent is extended or adjusted under 35 U.S.C. 154(b) by 0 days.

(21) Appl. No.: 10/332,166

(22) PCT Filed: May 19, 2001

(86) PCT No.: PCT/EP01/05764

§ 371 (c)(1), (2), (4) Date: May 6, 2003

(87) PCT Pub. No.: WO02/02959

PCT Pub. Date: Jan. 10, 2002

(65) Prior Publication Data

US 2003/0171152 A1 Sep. 11, 2003

(30) Foreign Application Priority Data

Jul. 6, 2000 (DE) .......................................... 100 32 853

(51) Int. Cl.⁷ .............................................. F16D 3/224
(52) U.S. Cl. ...................................... 464/145; 464/906
(58) Field of Search ............................. 464/145, 144, 464/143, 906, 15

(56) References Cited

U.S. PATENT DOCUMENTS

| 1,916,442 A | 7/1933 | Rzeooa |
| 3,982,840 A | 9/1976 | Grosseau |
| 4,611,373 A | 9/1986 | Hazebrook |
| 5,167,584 A | 12/1992 | Krude |
| 5,509,857 A | 4/1996 | Flaugher |
| 5,599,234 A | 2/1997 | Harz et al. |
| 5,885,162 A | 3/1999 | Sakamoto et al. |
| 6,132,316 A | 10/2000 | Statham |
| 6,135,891 A * | 10/2000 | Sone et al. ................. 464/145 |
| 6,241,615 B1 * | 6/2001 | Jacob ......................... 464/145 |

FOREIGN PATENT DOCUMENTS

| DE | 1 298 785 | 7/1969 |
| DE | 26 06 752 C2 | 9/1984 |
| DE | 198 31 014 A1 | 3/2000 |
| EP | 0 802 341 A1 | 10/1997 |
| FR | 2 781 023 A1 | 7/1999 |
| GB | 847569 | 11/1960 |
| GB | 978230 | 12/1964 |
| JP | 2000-145805 | 5/2000 |

* cited by examiner

Primary Examiner—Kenn Thompson

(57) ABSTRACT

The invention relates to a constant velocity joint having an outer part (3), an inner part (8), a cage (14) and balls (24). For the purpose of fitting the inner part (8) in the cage (14), there is provided a groove (16a) which can be entered by the inner part (8) by means of the web (13), so that the inner part (8) can be introduced into the cage (14), although the outer diameter of the inner part (8) is greater than that of the end aperture of the cage (14).

6 Claims, 2 Drawing Sheets

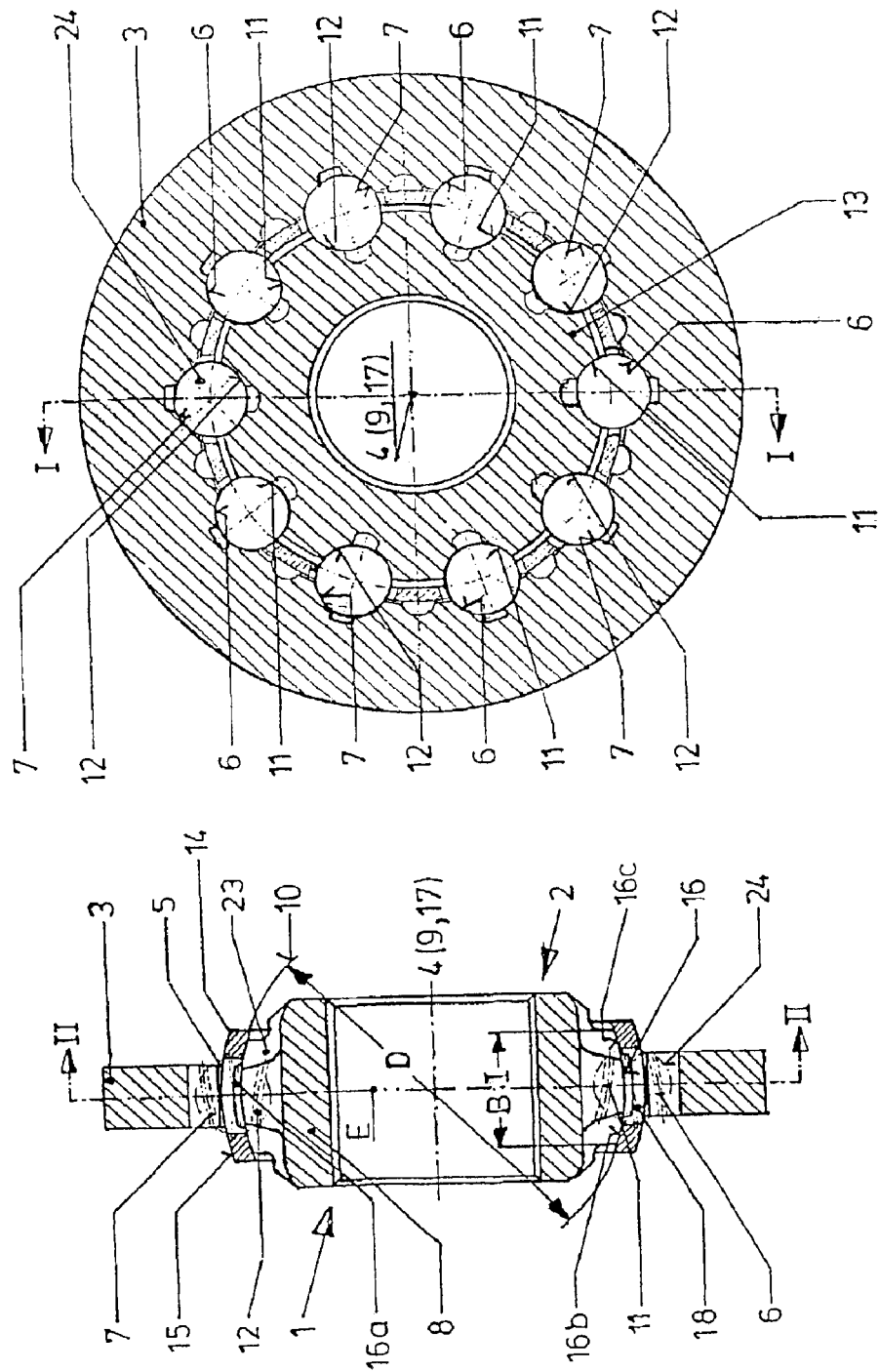

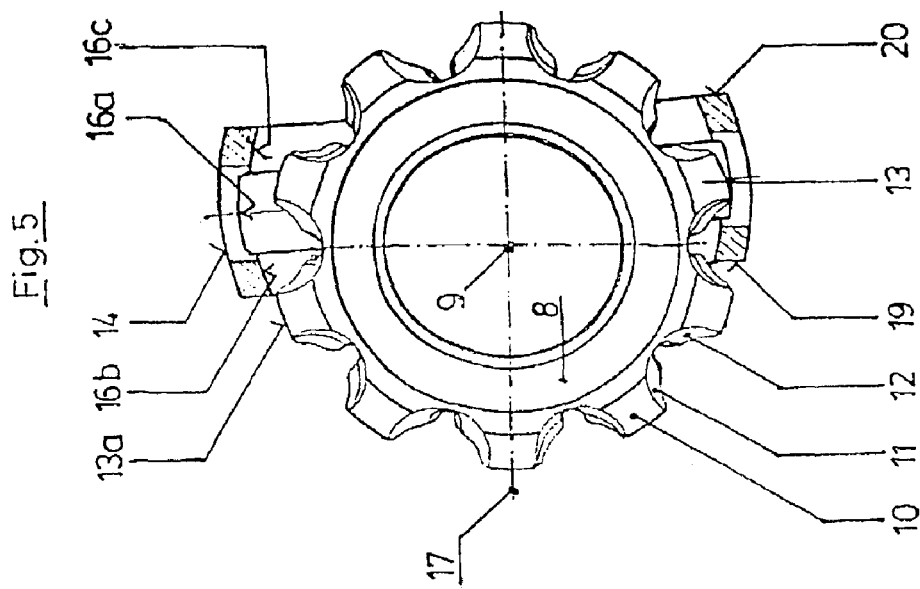
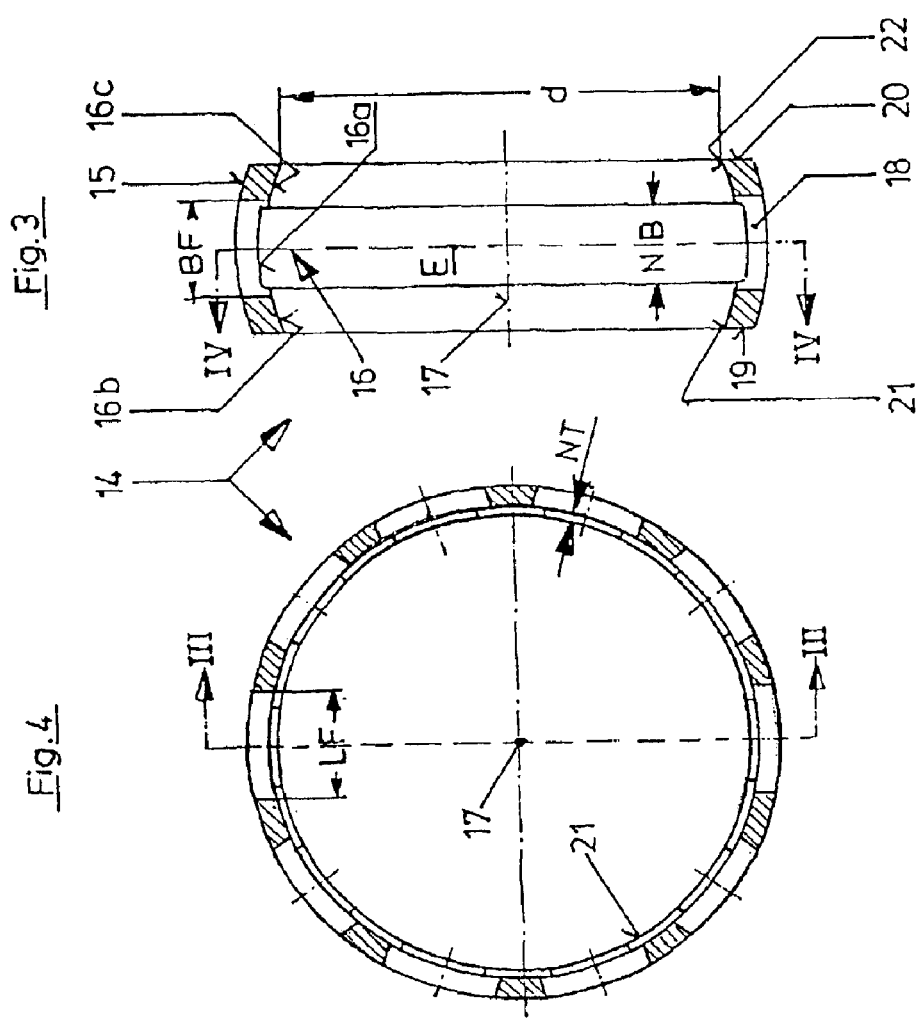

HOMOCINETIC JOINT

BACKGROUND OF THE INVENTION

The invention relates to a constant velocity joint. In particular, it relates to the inner part being assembled relative to the cage, with the cage being annular in shape and having a spherical outer face and a spherical inner face and with the cage, by means of its spherical inner face, being guided on a spherical outer face of the inner part of the constant velocity joint.

In such constant velocity joints, the diameter of the spherical outer face of the inner part is greater than that of the end apertures of the cage which is guided by a suitable face on the spherical outer face. To be able to mount the cage, it is known, for example, to provide recesses which start from the end faces of the cage, whose number corresponds to the number of webs of the inner part between each two circumferentially adjoining inner running grooves and which permit the inner part to be slid axially into the cage. The recesses are arranged in the circumferential region which comprises the windows. After the inner part has been inserted, the cage is rotated relative to the inner part, so that the webs of the inner part are arranged in the region of the webs remaining between two circumferentially adjoining windows of the cage, which means that the cage and the inner part are axially secured relative to one another. It is a bayonet-type assembly. As the recesses for introducing the inner part are arranged in the region of the cage which is weakened by the windows, this has an adverse effect on the strength of the cage.

Furthermore, it is also known to connect the inner part and the ball cage relative to one another in a position in which the longitudinal axis of the inner part and the longitudinal axis of the cage intersect one another, with the inner part being introduced through the end aperture of the cage. It is provided that at least one of the webs is shortened to such an extent that it is able to pass through a window of the cage and extend further into the cage through the end aperture. However, this measure adversely affects the guidance of the balls which, while participating in the transmission of torque, are guided in the shortened inner running grooves.

SUMMARY OF THE INVENTION

With reference to constant velocity joints, in particular constant velocity fixed ball joints wherein the width of the inner part exceeds the length of the windows of the cage in the circumferential direction, it is the object of the present invention to permit an assembly procedure which does not adversely affect the guidance of the balls in the widows of the cage and in the inner running grooves. Furthermore, it is the object of the present invention to prevent as far as possible the cage from being weakened.

In accordance with the invention, the objective is achieved by providing a constant velocity joint having a first end and a second end and comprising an outer part with a longitudinal outer part axis, with an aperture which is centered on the longitudinal outer part axis and extends axially through the outer part, with outer running grooves which are distributed in the aperture around the longitudinal outer part axis;

an inner part which is arranged in the aperture of the outer part, with a longitudinal inner part axis, with a spherical outer face, with inner running grooves which are distributed in the outer face around the longitudinal inner part axis and which are separated from one another by webs, wherein one outer running groove and one inner running groove each are arranged opposite one another and form a pair of tracks;

a cage which comprises a longitudinal cage axis, which is annular in shape and is provided with circular end apertures and comprises an outer face and an inner face and is arranged in the aperture between the outer part and the inner part, which is provided with windows which correspond to the circumferentially distributed pairs of tracks, which extend between the inner face and the outer face and are arranged symmetrically relative to a central cage plane on which the longitudinal cage axis is arranged perpendicularly and which extend in the circumferential direction along a length which is greater than their width, whose inner face comprises an annular groove which extends symmetrically relative to the central cage plane and intersects the windows and which, laterally thereto, towards the end faces, is provided with hollow spherical faces by means of which said cage is guided on the outer face of the inner part;

a diameter of the circular apertures is smaller than a diameter of the spherical outer face of the inner part;

balls of which one each is accommodated and guided in a window and engages an inner running groove and outer running groove respectively, associated with the respective pair of tracks, wherein a width of the inner part, in the region of the webs, is greater than the length of the windows in the circumferential direction and wherein a groove depth and a groove width of the groove of the cage are dimensioned in such a way that, when introducing the inner part into one of the apertures of the cage in a position in which the longitudinal inner part axis and the longitudinal cage axis intersect one another approximately perpendicularly and in which there is contact between a web of the inner part and the groove, the web arranged diametrically relative thereto can be introduced through the opening into the cage.

There is thus obtained a constant velocity joint wherein the strength of the cage is affected only insubstantially, nor is there any effect on the guidance of the torque transmitting balls in the inner running grooves because all the inner running grooves comprise the same length.

It is advantageous if, in the region of the webs, the inner part portion which is in contact with the balls is smaller towards the outer face than the groove width of the groove of the cage. This results in low friction operating conditions. There cannot occur any self-inhibition because there is no contact between the outer face of the inner part and the inner cage face in endangered region. The guidance of the cage, by means of its hollow spherical portions arranged on both sides of the groove, on the outer part results in clear guiding conditions. In the main operating region of the joint, i.e. at smaller articulation angles, friction is reduced. The width of the groove is also preferably smaller than the width of the windows of the cage.

Advantageous cross-sectional conditions in the region of the webs between two circumferentially adjoining windows of the cage are obtained if the base of the groove in a sectional plane containing the longitudinal axis of the cage is designed as a circular arch in the point of intersection between a central cage plane and the longitudinal cage axis. The groove base thus extends concentrically relative to the outer face of the cage.

It is particularly advantageous if the above-described characteristics are applied to a constant velocity joint wherein the outer part comprises first outer running grooves and second outer running grooves, wherein the first outer running grooves start from the first end and extend in an undercut-free way towards the second end and the second outer running grooves start from the second end and extend in an undercut-free way towards the first end, and wherein the inner part, in its outer face, comprises first inner running grooves and second inner running grooves, wherein the first inner running grooves start from the first end and extend in an undercut-free way towards the second end and the second inner running grooves start from the second end and extend in an undercut-free way towards the first end and wherein a respective first outer running groove and first inner running groove as well as a respective second outer running groove and second inner running groove are positioned opposite one another and form a pair of tracks.

BRIEF DESCRIPTION OF THE DRAWINGS

A preferred embodiment of the invention is diagrammatically illustrated in the drawing wherein FIG. 1 is a longitudinal section through a constant velocity joint according to sectional line I—I in FIG. 2.

FIG. 2 is a cross-section along sectional line II—II in FIG. 1.

FIG. 3 shows an inventive cage in the form of an individual part in a longitudinal section along sectional line III—III in FIG. 4.

FIG. 4 is a section through the central cage plane along sectional line IV—IV in FIG. 3, and FIG. 5, in a longitudinal section, shows a cage and an inner part arranged relative thereto with an intersected longitudinal axis when being introduced into the cage, with the inner part being shown in a plan view.

DETAILED DESCRIPTION OF THE INVENTION

FIGS. 1 and 2 will be described jointly below. To be able to explain the way in which the parts are associated with one another and aligned relative to one another, the first end of the constant velocity joint has been given the reference number 1 and the second end the reference number 2. "End" does not refer to a definite end at a particular line or at a particular point, but it refers to the individual parts, taking into account their alignment and configuration.

The constant velocity joint is a fixed joint and comprises an outer part 3 with an aperture 5 which is centered on the longitudinal axis 4 of the outer part and extends through the outer part 3. In the aperture 5, there are arranged first outer running grooves 6 which are circumferentially distributed around the longitudinal axis 4 of the outer part and which start from the first end 1 in an undercut-free way, i.e. they extend curve-like. There are provided second outer running grooves 7 which alternate with the first outer running grooves 6 and which start from the second end 2 in an undercut-free way towards the first end 1. The outer part 3 is disc-like. It can additionally be provided with means for being connected to a driving or driven component of a driveline.

Furthermore, the constant velocity joint comprises an inner part 8 with a longitudinal axis 9. There is provided a through-bore which is centered on the longitudinal axis 9 of the inner part, which is toothed and which serves to connect the inner part 8 to a driving or driven component of a driveline. First inner running grooves 11 and second inner running grooves 12 are alternately worked into the inner part 8 in such a way that they are open towards the outside, i.e. towards the outer face 10. The outer face 10 is interrupted by the first inner running grooves 11 and the second inner running grooves 12 which are circumferentially distributed, so that between each two circumferentially adjoining first inner running grooves 11 and second inner running grooves 12, there are formed webs 13. The portions of the outer face 10 which are obtained in the region of the webs 13 are spherical. The first inner running grooves 11 start from the first end 1 and extend towards the second end 2 in an undercut-free way. Accordingly, the second inner running grooves 12 start from the second end 2 and extend towards the first end 1, again in an undercut-free way. In addition, the webs 13 comprise recesses which start from the two ends 1, 2 and which are provided in the form of enlarged grooves 23. The portion located between the enlarged grooves 23 constitutes the actual, used inner running grooves 11 and 12 respectively. It can also be seen that the width BI in the region of the webs 13 is smaller than the width of the inner part 8 in the region directly adjoining the through-bore. The inner part 8 is received in the aperture 5 of the outer part 3. Between the outer face 10 of the inner part 8 and the wall of the aperture 5, there is arranged a cage 14. On its outside, the cage 14 comprises a substantially spherical outer face 15 which is arranged at a distance from the wall of the aperture 5. Furthermore, the cage 14 comprises windows which are arranged symmetrically relative to the central cage plane E. Said windows are distributed in accordance with the pairs of tracks which are obtained from a first outer running groove 6 and an opposed first inner running groove 11 as well as from a second outer running groove 7 and an opposed second inner running groove 12. The cage 14 comprises a longitudinal cage axis 17.

FIGS. 1 and 2 show the constant velocity in its aligned position, so that the longitudinal axis 4 of the outer part, the longitudinal axis 9 of the inner part and the longitudinal axis 17 of the cage coincide. The cage 14 comprises an inner face 16 which is centered on the longitudinal cage axis 17. The inner face 16 comprises a groove 16a which is arranged symmetrically relative to the central cage plane E and whose width is greater than the active part of the inner running grooves 11, 12 between the two enlarged grooves 23. However, the groove width NB is smaller than the width BF of the windows 18 of the cage 14 (FIG. 3). Furthermore, each window 18 of the cage 14 receives a ball 24 which projects radially outwardly and radially inwardly beyond the cage 14 and which engages inner and outer grooves forming a pair of tracks. The parts of the inner face 16 which are located on the sides of the groove 16a are provided in the form of hollow spherical faces 16b, 16c by means of which the cage 14 is guided on the spherical outer face 10 of the inner part 8.

FIGS. 3 and 4 show more details of the cage 14. It can be seen that the windows 18 with the width BF are arranged symmetrically relative to the central cage plane E. The windows 18 are intersected by the groove 16a which comprises the groove width NB. However, the groove width NB is smaller than the width BF of the windows 18. The base of the groove 16a substantially follows the contour of the outer face 10 of the cage 14 and is arranged concentrically relative thereto, i.e. in a section according to FIG. 3 it comprises a center which is positioned in the point of intersection between the longitudinal cage axis 17 and the central cage plane E. There are provided radius transitions which extend from the groove base to the side faces. For a constant velocity joint of the type illustrated, the depth of the groove 16a is relatively small and can range between approx. 1 mm to 1.5 mm. In the portion between the groove 16a and the first end face 19 as well as between the groove 16a and the second end face 20, there are provided hollow spherical faces 16b, 16c. In the region of the first end face 19, there is provided a first aperture 21 which is circular in shape and whose diameter d is smaller than the diameter D of the inner part 8 (see FIG. 1).

Furthermore, FIG. 4 shows a window 18 whose length LF is shown to extend in the circumferential direction. However, the length LF is shorter than the width BI (as shown in FIG. 1) of the inner part 8 in the region of the first and second inner running grooves 11, 12. Furthermore, it is proposed that the active portion of the first and second inner running grooves 11, 12, which is positioned between the enlarged grooves 23, is shorter in the region towards the outer face 10 than the groove width NB, so that at a small operating angle or in the aligned position, there is no contact in this region between the cage 14 and the outer face 10 of the inner part 8.

Although the diameter d of the apertures 21, 22 is smaller than the diameter D of the outer face 10 of the inner part 8 and although the dimension BI is greater than the dimension LF, it is possible to mount the inner part 8 in the cage 14 because of the groove 16a; the way in which said assembly takes place will be described in connection with FIG. 5. The inner part 8 is mounted in the cage 14 in such a way that the longitudinal axis 9 of the inner part and the longitudinal axis 17 of the cage intersect one another. First, the web 13 according to FIG. 5 is introduced into the cage 14 through the aperture 21, starting from the end face 19, so that said web 13 comes into contact with the groove 16a. This makes it possible for the diametrically arranged web 13a also to pass through the aperture 21. When this has taken place, the inner part 8 is pivoted relative to the cage 14 in such a way that the longitudinal axis 9 of the inner part and the longitudinal axis 17 of the cage are aligned in parallel relative to one another and, respectively, intersect the central cage plane E in a common point.

List of Reference Numbers 1 first end
2 second end
3 outer part
4 longitudinal axis of outer part
5 aperture
6 first outer running grooves
7 second outer running grooves
8 inner part
9 longitudinal axis of inner part
10 spherical outer face
11 first inner running groove
12 second inner running groove
13, 13a web
14 cage
15 outer face
16 inner face
16b, 16c hollow spherical face
17 longitudinal cage axis
18 window
19 first end face
20 second end face
21 first aperture
22 second aperture
23 enlarged groove
24 ball
BI width of inner part
D outer diameter of inner part
d diameter of aperture in cage
E central cage plane
BF width of windows
LF length of windows
NB groove width
Nt groove depth

What is claimed is:

1. A constant velocity joint having a first end (1) and a second end (2) and comprising:

an outer part (3) with a longitudinal outer part axis (4) and including an aperture (5) which is centered on the longitudinal outer part axis (4) and extends axially through the outer part (3), and outer running grooves (6, 7) which are distributed in the aperture (5) around the longitudinal outer part axis (4);

an inner part (8) which is arranged in the aperture (5) of the outer part (3), with a longitudinal inner part axis (9) and including a spherical outer face (10) with inner running grooves (11, 12) which are distributed in the outer face (10) around the longitudinal inner part axis (9) and which are separated from one another by webs (13), wherein one outer running groove (6, 7) and one inner running groove (11, 12) each are arranged opposite one another and form a pair of tracks;

a cage (14) which comprises a longitudinal cage axis (17) and which is annular in shape and is provided with circular end apertures (21, 22) and comprises an outer face (15) and an inner face (16) and is arranged in the aperture (5) between the outer part (3) and the inner part (8), the cage having windows (18) which correspond to the circumferentially distributed pairs of tracks, and which extend between the inner face (16) and the outer face (15) and are arranged symmetrically relative to a central cage plane (E) on which the longitudinal cage axis (17) is arranged perpendicularly and which extend in the circumferential direction along a length (LF) which is greater than the window width (BF), the cage inner face (16) comprises an annular groove (16a) which extends symmetrically relative to the central cage plane (E) and intersects the windows (18) and which, laterally thereto, towards end faces (19, 20) of the cage, is provided with hollow spherical faces (16b, 16c) by means of which said cage (14) is guided on the outer face (10) of the inner part (8), and wherein a diameter (d) of the circular apertures (21, 22) is smaller than a diameter (D) of the spherical outer face (10) of the inner part (8); and balls (24) of which one each is accommodated and guided in a window (18) and engages an inner running groove and outer running groove respectively associated with the respective pair of tracks, wherein a width (BI) of the inner part (8), in the region of the webs (13), is greater than the length (LF) of the windows (18) in the circumferential direction and wherein a groove depth (NT) and a groove width (NB) of the groove (16a) of the cage (14) are dimensioned in such a way that, when introducing the inner part (8) into one of the apertures (21, 22) of the cage (14) in a position in which the longitudinal inner part axis (9) and the longitudinal cage axis (17) intersect one another approximately perpendicularly and in which there is contact between a web (13) of the inner part (8) and the groove (16a), the web (13a) arranged diametrically relative thereto can be introduced through one of the apertures (21 or 22) into the cage (14).

2. A constant velocity joint according to claim 1, wherein, in the region of the webs (13), a portion of the inner part (8)

which comes into contact with the balls (24), towards the outer face (10), is smaller than the groove width (NB) of the groove (16a) of the cage (14).

3. A constant velocity joint according to claim 1, wherein the groove width (NB) of the groove (16a) is smaller than the width (BF) of the windows (18) of the cage (14).

4. A constant velocity joint according to claim 1, wherein, in the plane of intersection containing the longitudinal cage axis (17), the base of the groove (16a) is designed as a circular arch around the point of intersection between a central cage plane (E) and the longitudinal cage axis (17).

5. A constant velocity joint according to claim 1, wherein the outer part (3) comprises first outer-running grooves (6) and second outer running grooves (7), wherein the first outer running grooves (6) start from the first end (1) and extend in an undercut-free way towards the second end (2) and the second outer running grooves (7) start from the second end (2) and extend in an undercut-free way towards the first end (1), and wherein the inner part (8), in its outer face (10), comprises first inner running grooves (11) and second inner running grooves (12), wherein the first inner running grooves (11) start from the first end (1) and extend in an undercut-free way towards the second end (2) and the second inner running grooves (12) start from the second end (2) and extend in an undercut-free way towards the first end (1) and wherein a respective first outer running groove (6) and first inner running groove (11) as well as a respective second outer running groove (7) and second inner running groove (12) are positioned opposite one another and form a pair of tracks.

6. A constant velocity joint according to claim 1 wherein the depth of the annular groove (16a) is between approximately 1.0 mm and 1.5 mm.

* * * * *